(12) United States Patent
Mori

(10) Patent No.: US 6,477,897 B1
(45) Date of Patent: Nov. 12, 2002

(54) VIBRATING GYROSCOPE

(75) Inventor: Akira Mori, Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 12 days.

(21) Appl. No.: 09/704,647

(22) Filed: Nov. 2, 2000

(30) Foreign Application Priority Data

Nov. 5, 1999 (JP) ............................................. 11-315138

(51) Int. Cl.$^7$ ............................................. G01P 15/00
(52) U.S. Cl. ................................................ 73/504.12
(58) Field of Search ........................ 73/504.12, 504.14; 310/329, 330, 331, 332, 357, 358, 366

(56) References Cited

U.S. PATENT DOCUMENTS

| | | | | |
|---|---|---|---|---|
| 5,635,786 A | * | 6/1997 | Fujimoto et al. | ............ 310/316 |
| 5,837,895 A | * | 11/1998 | Fujimoto | ................. 73/540.12 |
| 6,023,973 A | * | 2/2000 | Yabe et al. | ............... 73/504.12 |
| 5,058,777 A | * | 5/2000 | Fujimoto et al. | ........ 73/504.12 |

FOREIGN PATENT DOCUMENTS

| | | |
|---|---|---|
| EP | 0685704 | 5/1995 |
| EP | 9304081 | 5/1996 |
| EP | 0860685 | 2/1998 |
| EP | 0881465 | 5/1998 |

* cited by examiner

*Primary Examiner*—Richard A. Moller
(74) *Attorney, Agent, or Firm*—Ostrolenk, Faber, Gerb & Soffen, LLP

(57) ABSTRACT

A vibrating gyroscope includes a vibrator having a plurality of piezoelectric members stacked and polarized in directions opposing each other; at least one drive electrode formed on one of the mutually opposing main surfaces of the vibrator to input a signal for exciting the vibrator; at least two detection electrodes formed on one of the mutually opposing main surfaces of the vibrator to output a signal in accordance with vibration of the vibrator; and at least one reference electrode formed on one of the mutually opposing main surfaces of the vibrator to be connected to a reference potential. The reference electrode is formed in a position opposing the drive electrodes and the detection electrodes.

8 Claims, 9 Drawing Sheets

VIBRATING GYROSCOPE

BACKGROUND OF THE INVENTION

1. Field of the Invention

The present invention relates to vibrating gyroscopes and, more specifically, it relates to vibrating gyroscopes for use in camera-shake corrections, navigation systems, vehicle-posture control, and the like.

2. Description of the Related Art

FIG. 10 is an illustration showing an example of a conventional vibrating gyroscope 1. The vibrating gyroscope 1 includes a rectangular-parallelepiped vibrator 2. The vibrator 2 is formed by laminating two planar piezoelectric members 3a and 3b. The piezoelectric members 3a and 3b are polarized in directions opposing each other. Between the piezoelectric members 3a and 3b, an intermediate electrode 4 is formed. In addition, on one main surface of the piezoelectric member 3a, detection electrodes 5a and 5b, which are two-split parts, are formed. Furthermore, on the entire other main surface of the piezoelectric member 3b, a drive electrode 6 is formed.

In order to use the vibrating gyroscope 1, the detection electrodes 5a and 5b are connected to an adding circuit 7. The adding circuit 7 is connected to a gain control circuit (AGC circuit) 8. The AGC circuit 8 is connected to a phase circuit 9. A signal output from the phase circuit 9 is input to the drive electrode 6. The adding circuit 7, the AGC circuit 8, and the phase circuit 9 form a drive circuit. In addition, the detection electrodes 5a and 5b are connected to a differential circuit 10. The differential circuit 10 is connected to a synchronous detection circuit 11. A signal output from the differential circuit 10 is detected in synch with the signal of the AGC circuit 8. In addition, The synchronous detection circuit 11 is connected to a smoothing circuit 12, which is connected to a DC amplifying circuit 13.

In the vibrating gyroscope 1, by vibration of the vibrator 2, signals output from the detection electrodes 5a and 5b are added by the adding circuit 7, and the added signal is amplified by the AGC circuit 8 so as to make the amplitude of the signal constant. After this, the amplified signal is phase-adjusted by the phase circuit 9. The driving signal obtained in this way is input to the drive electrode 6, whereby the vibrating gyroscope 1 is self-excited. As a result, the vibrator 2 performs bending-vibration in a direction orthogonal to the drive electrode 6.

From the detection electrodes 5a and 5b, signals in accordance with the bending-vibration of the vibrator 2 are output. When the vibrating gyroscope 1 does not rotate, the bending conditions of the parts where the detection electrodes 5a and 5b are formed remain unchanged. Thus, the same signal from each of the two detection electrodes 5a and 5b is output. Therefore, the output of the differential circuit 10 becomes zero. When a rotation angular velocity is added around the center axis of the vibrator 2, Coriolis force causes a difference in the bending-vibration conditions between the part where the detection electrode 5a is formed and the part where the detection electrode 5b is formed. As a result, the detection electrodes 5a and 5b output different signals. Thus, the differential circuit 10 outputs a signal in accordance with the difference between the signals output from the detection electrodes 5a and 5b. After the signal is detected by the synchronous detection circuit 11 and smoothed by the smoothing circuit 12, the signal is amplified by the DC amplifying circuit 13, with the result that a DC signal in accordance with the rotation angular velocity can be obtained. Therefore, by measuring the signal output from the DC amplifying circuit 13, the rotation angular velocity added to the vibrating gyroscope 1 can be detected.

Regarding the use of the vibrating gyroscope 1, when a reference potential is used to secure a stable operation, the intermediate electrode 4 disposed between the piezoelectric members 3a and 3b is connected to the reference potential.

An equivalent circuit for representing the driving detection circuit of the vibrating gyroscope 1 is a circuit as shown in FIG. 11. In this equivalent circuit, the symbol Vdrv denotes a circuit driving voltage, the symbol Rd denotes a drive resistance, the symbol Z denotes a vibrator characteristic impedance, the symbol Rs denotes a detection resistance, and the symbol Vs denotes a detection voltage. As shown in the equivalent circuit, the detection voltage Vs is determined by the partial-potential ratio between Rd, Z, and Rs. However, when the values of Rd, Z, and Rs change due to changes in external environments and changes with the elapse of time, the value of Vs also changes. Thus, when changes in the detection voltage occur due to changes in the external environments and changes with the elapse of time, a rotation angular velocity cannot be accurately detected.

In addition, when the intermediate electrode is connected to the reference potential to secure a stable operation, it is necessary to lead out a wiring pattern from the intermediate electrode. However, in order to lead out the wiring pattern from a thin intermediate electrode, the structure must become complicated, with the result that having such a structure is not advantageous in terms of processing accuracy and cost.

SUMMARY OF THE INVENTION

Accordingly, it is an object of the present invention to provide a vibrating gyroscope capable of being connected to a reference potential with a simple structure and suppressing changes in a detection signal due to changes in external environments and changes with the elapse of time.

The present invention provides a vibrating gyroscope including a vibrator on which a plurality of piezoelectric members polarized in directions opposing each other is laminated, at least one drive electrode formed on one of the mutually opposing main surfaces of the vibrator to input a signal for exciting the vibrator, at least two detection electrodes formed on one of the mutually opposing main surfaces of the vibrator to output a signal in accordance with vibration of the vibrator, and at least one reference electrode formed on one of the mutually opposing main surfaces of the vibrator to be connected to a reference potential. In this vibrating gyroscope, the reference electrode is formed in a position opposing the drive electrodes and the detection electrodes.

In this vibrating gyroscope, the drive electrodes and the detection electrodes may be formed on the same main surface of the vibrator or may be formed on different main surfaces of the vibrator.

Furthermore, the detection electrodes may be connected to a charging amplifier for converting a generated charge into a voltage to detect a rotation angular velocity input from a differential signal of the output of the charging amplifier.

By connecting the reference potential formed in the position opposing the drive electrodes and the detection electrodes to the reference potential of the driving detection circuit, electrical isolation between the driving side and the detecting side can be facilitated. As a result, influence of changes in the drive resistance of the driving side becomes less. Additionally, a signal-detection reference can be defined so that accurate signal detection can be performed.

As a result, the condition of a vibrator like the AGC circuit can be accurately monitored.

Furthermore, since the input impedance of the charging amplifier for converting changes in a charge into a voltage is zero, by connecting the detection electrodes to the charging amplifying, the voltage of the detection signal is not influenced by the characteristic impedance of the vibrator. Thus, changes in the vibration of the vibrating gyroscope according to the rotation angular velocity can be accurately detected.

According to the present invention, the reference electrode is disposed on either one of the main surfaces of the vibrator in such a manner that the reference electrode is opposed to the drive electrodes and the detection electrodes, and the reference electrode of the vibrating gyroscope is connected to the reference potential. With this arrangement, since there is less influence from the changes in circuit impedance due to the changes in external environments and changes with the elapse of time, a rotation angular velocity can be accurately detected. In addition, since the reference electrode is formed on the main surface of the vibrator, the reference electrode can be easily connected to the reference potential. As a result, when compared with the conventional gyroscope in which an intermediate electrode is used as a reference electrode, the gyroscope of the present invention is more advantageous in terms of processing accuracy and cost.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF PREFERRED EMBODIMENTS

Hereinafter, the preferred embodiments of the present invention are explained in detail with reference to the drawings.

Figure 1:
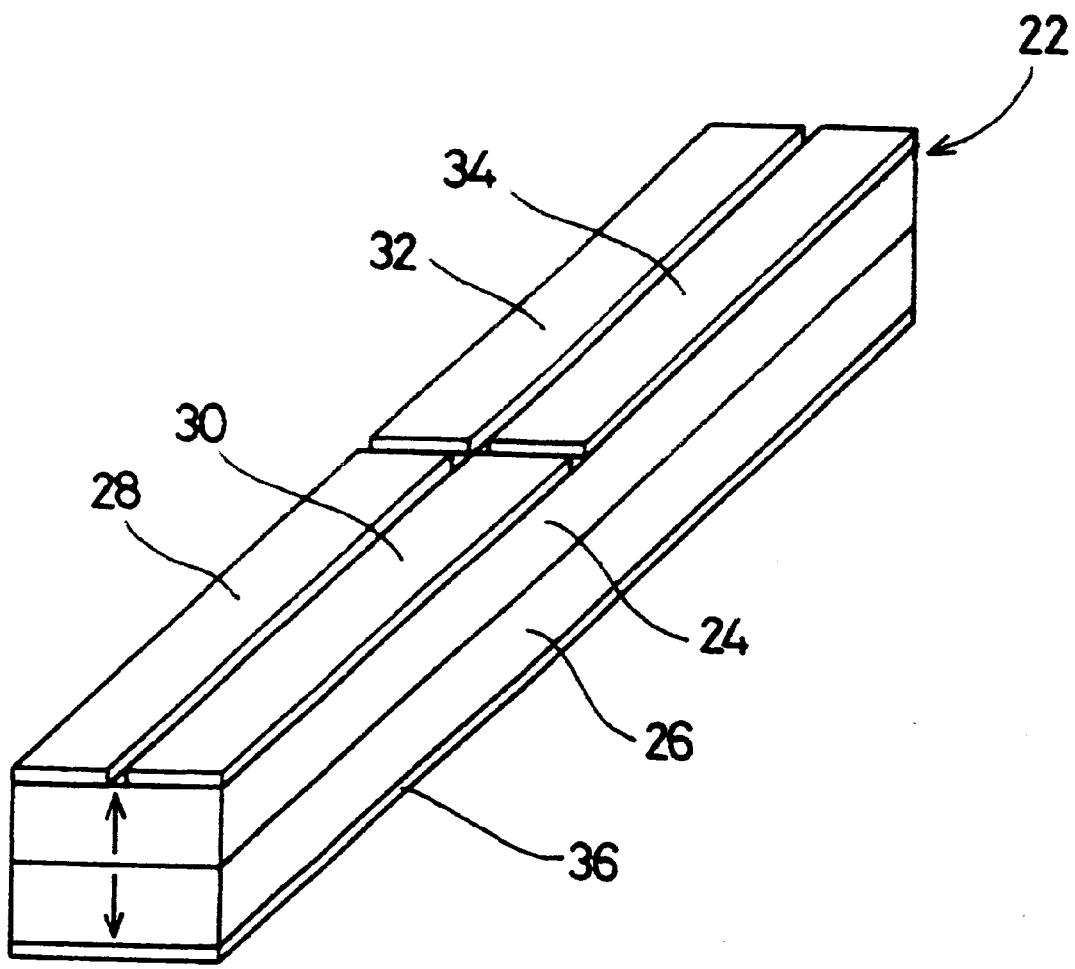
FIG. 1 is a perspective view showing an example of a vibrating gyroscope according to the present invention.

FIG. 1 shows a perspective view showing an example of a vibrating gyroscope 20 according to the present invention. The vibrating gyroscope 20 includes a rectangular-parallelepiped vibrator 22. The vibrator 22 is formed by laminating two planar piezoelectric members 24 and 26. The piezoelectric members 24 and 26 are formed of, for example, piezoelectric ceramic such as lead zirconate titanate (PZT), crystal, and piezoelectric single crystal such as $LiTaO_3$. The piezoelectric members 24 and 26 are polarized in directions opposing each other, as indicated by arrows in FIG. 1. On the piezoelectric member 24, four-split electrodes 28, 30, 32, and 34 are formed. The two electrodes 28 and 30 disposed on a front position of one main surface (e.g. the top main surface) of the vibrator 22 in a longitudinal direction of the vibrator 12 are used as detection electrodes. The two electrodes 32 and 34 disposed at a rear portion of the top main surface of the vibrator 22 in the other longitudinal direction of the vibrator 12 are used as drive electrodes. In addition, on the entire opposing main surface (e.g., the lower main surface) of the vibrator 22, a reference electrode 36 is formed.

Figure 2:
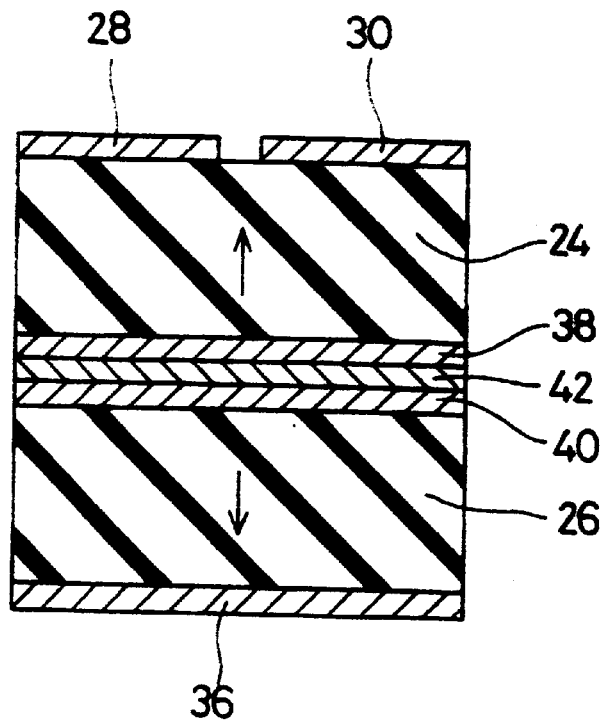
FIG. 2 is an illustration showing a sectional view of an example of a vibrator used in the vibrating gyroscope shown in FIG. 1.
Figure 3:
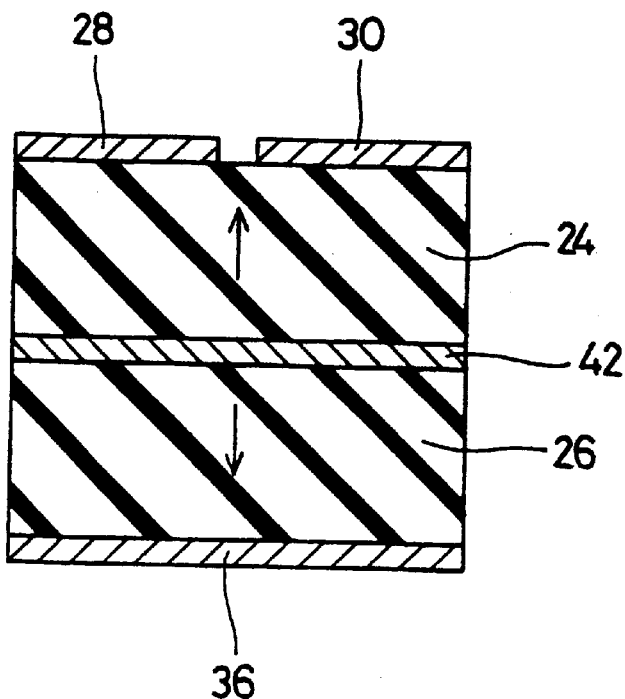
FIG. 3 is an illustration showing a sectional view of another example of a vibrator used in the vibrating gyroscope shown in FIG. 1.

The vibrating gyroscope 20 is produced, for example, by bonding the two piezoelectric members 24 and 26 together. Each of the piezoelectric members 24 and 26 is formed, for example, by forming electrodes on both surfaces of a planar member formed of a piezoelectric ceramic material and applying a DC electric field between the electrodes to polarize the planar member. Thus, as shown in FIG. 2, by bonding the electrodes 38 and 40 of the two piezoelectric members 24 and 26 by an adhesive 42, the vibrator 22 can be formed. Then, after bonding the two piezoelectric members 24 and 26 together, the electrode formed on one of the main surfaces is split by dicer cutting to form the detection electrodes 28 and 30, and the drive electrodes 32 and 34. In the vibrating gyroscope 20, since the electrodes 38 and 40 bonded by the adhesive 42 are not used, as shown in FIG. 3, the piezoelectric members 24 and 26 without the electrodes 38 and 40 formed thereon may be bonded together. In addition, after bonding piezoelectric members having no electrodes formed thereon together in such a manner that the mutual polarizing directions thereof are opposite, electrodes may be formed by sputtering, evaporation, printing, or the like.

Figure 4:
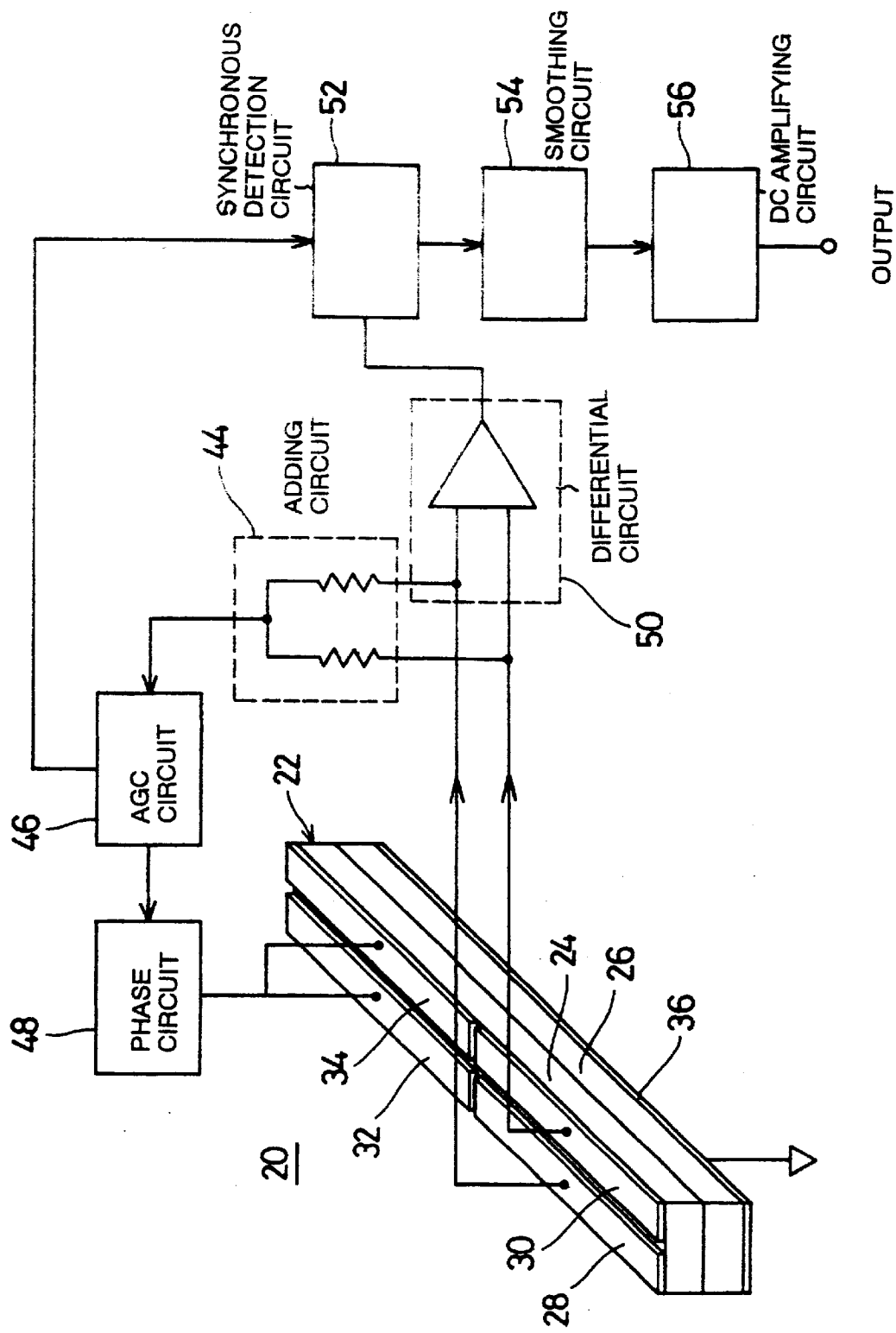
FIG. 4 is a block diagram showing an example of a circuit for using the vibrating gyroscope shown in FIG. 1.

In order to use the vibrating gyroscope 20, the circuit shown in FIG. 4 may be used. The detection electrodes 28 and 30 are connected to an adding circuit 44. The adding circuit 44 is connected to a gain control circuit (AGC circuit) 46. The AGC circuit 46 is connected to a phase circuit 48. Then, a signal output from the phase circuit 48 is input to the drive electrodes 32 and 34.

In addition, the detection electrodes 28 and 30 are connected to a differential circuit 50. The differential circuit 50 is connected to a synchronous detection circuit 52, and a signal output from the differential circuit 50 is detected in synch with the signal from the AGC circuit 46. A signal output from the synchronous detection circuit 52 is smoothed by a smoothing circuit 54 and amplified by a DC amplifying circuit. A reference electrode 36 is connected to the reference potential of the driving detection circuit. Typically, the reference potential is a ground potential, and therefore the reference electrode 36 is grounded.

In the vibrating gyroscope 20, by supplying a driving signal to the drive electrodes 32 and 34, an electric field is applied between the drive electrodes 32 and 34 and the reference electrode 36. Since the piezoelectric members 24 and 26 are polarized in the mutually opposing directions, while the piezoelectric member 24 elongates, the other piezoelectric member 26 shrinks, and while the piezoelectric member 24 shrinks, the other piezoelectric member 26 elongates. As a result, the vibrator 22 performs bending-vibration in a direction orthogonal to a surface on which the reference electrode 36 is formed.

When the vibrator 22 experiences bending vibrator, a charge is generated on each of the piezoelectric members 24 and 26, and the charge is output as a signal from each of the detection electrodes 28 and 30. The signal output from each of the detection electrodes 28 and 30 is added by the adding circuit 44, and amplified by the AGC circuit 46 so as to maintain the amplitude of the signal fixed. The signal output from the AGC circuit 46 is phase-adjusted by the phase circuit 48 to form a driving signal. The driving signal is input to each of the drive electrodes 32 and 34, whereby the vibrator 22 performs bending-vibration. In this way, a drive circuit is formed by the adding circuit 44, the AGC circuit 46, and the phase circuit 48, and self-excited driving allows the bending-vibration of the vibrator 22 to continue.

When the vibrator 20 does not rotate, the bending conditions of the parts where the detection electrodes 28 and 30 are formed remain the same. Thus, the signals output from the detection electrodes 28 and 30 are also the same. As a result, when the vibrator 22 does not rotate, the output of the differential circuit 50 is zero.

When the vibrator 22 experiences bending-vibration and, at the same time, the vibrator 22 rotates around its own center axis, Coriolis force works in a bending direction orthogonal to the direction in which the vibrator 22 vibrates at the time of non-rotation. With the Coriolis force, the vibrating direction of the vibrator 22 changes. As the vibrating direction of the vibrator 22 changes, the bending-vibrating conditions of the parts where the detection electrodes 28 and 30 are formed also change. Additionally, the signals output from the detection electrodes 28 and 30 change. That is, when the signal output from one of the detection electrodes 28 and 30 increases, the signal output from the other detection electrode decreases. Thus, a signal in accordance with the difference between the signals output from the detection electrodes 28 and 30 is output from the differential circuit 50.

The signal output from the differential circuit 50 is detected by the synchronous detection circuit 52 in synch with the signal from the AGC circuit 46. Detection of the synchronous detection circuit 52 occurs either during only the positive half-wavelength division of a signal output from the differential circuit 50 resulting in an output signal of one polarity from the synchronous detection current 50 or, during only the negative half-wavelengths thereof, resulting in an inverted output signal. By smoothing the signal output from the synchronous detection circuit 50 by the smoothing circuit 54 and amplifying the output signal by the DC amplifying circuit 56, a DC signal in accordance with the changes in the vibrating direction of the vibrator 22 can be obtained. Since the amount of changes in the vibrating direction of the vibrator 22 corresponds to the Coriolis force, by measuring the signal output from the DC amplifying circuit 56, a rotation angular velocity added to the vibrating gyroscope 20 can be detected.

When the rotation angular velocity added to the vibrating gyroscope 20 is in an opposite direction, the direction of the Coriolis force also becomes opposite, with result that the changes in the vibrating direction of the vibrator 22 become opposite. Thus, the changes in the signals output from the detection electrodes 28 and 30 become also opposite, and the phase of the signal output from the differential circuit 50 thereby becomes opposite. As a result, the polarity of the signal output from the synchronous detection circuit 52 becomes opposite, and a DC signal having an opposite polarity is output from the smoothing circuit 54. That is, with the polarity of the signal output from the DC amplifying circuit 56, the direction of the rotation angular velocity can be found. In this way, from the level of the signal output from the DC amplifying circuit 56, the magnitude of the rotation angular velocity can be detected. In addition, by the polarity of the signal output from the DC amplifying circuit 56, the direction of the rotation angular velocity can be detected.

Figure 5:
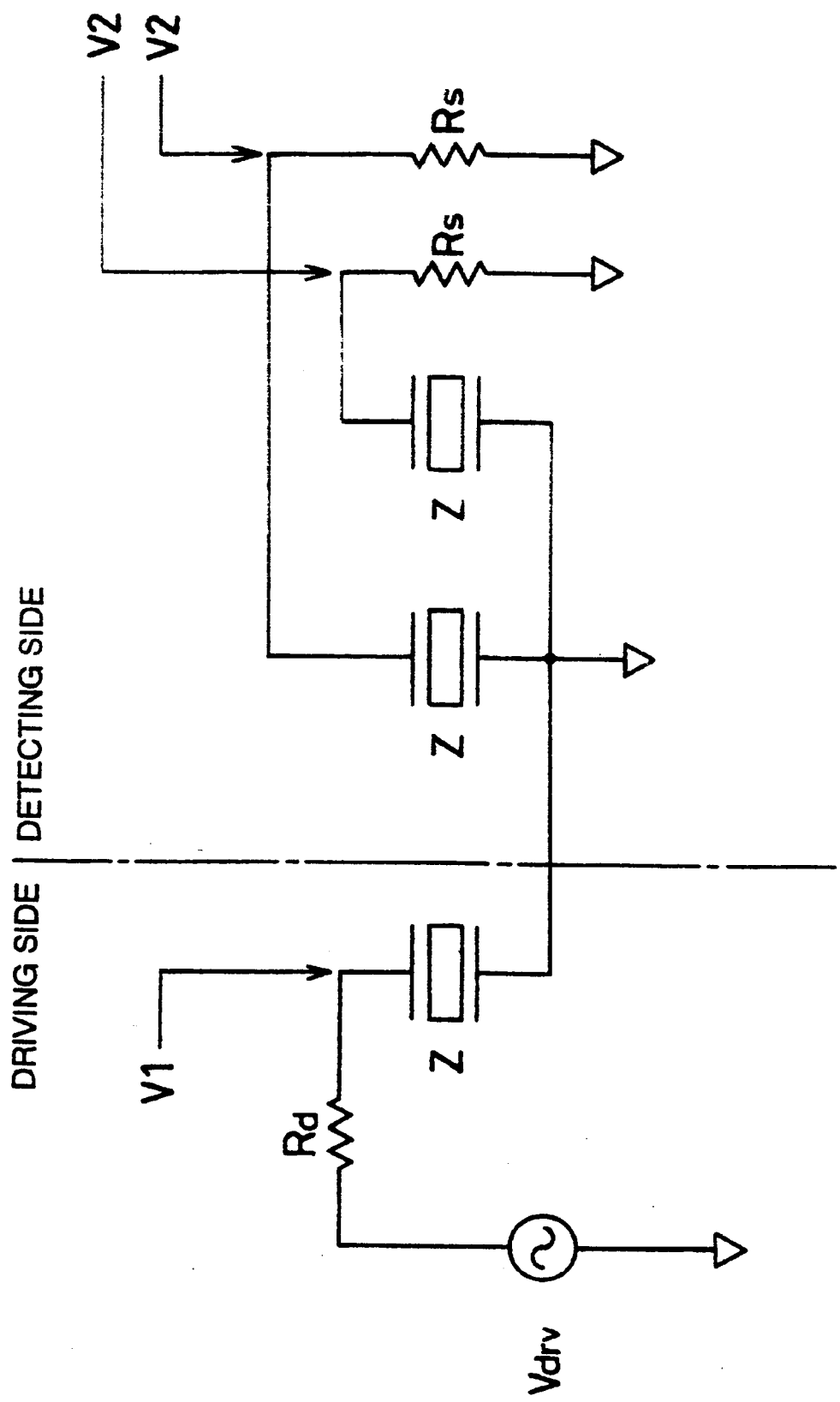
FIG. 5 is an equivalent circuit diagram of the vibrating gyroscope in the circuit shown in FIG. 4.

In the vibrating gyroscope 20, an equivalent circuit as shown in FIG. 5 can be obtained. In FIG. 5, the symbol Vdrv denotes a circuit driving voltage, the symbol Rd denotes a driving resistance, the symbol Z denotes a vibrator characteristic impedance, the symbol Rs denotes a detection resistance, the symbol V1 denotes a vibrator driving voltage, and the symbol V2 denotes a detection voltage. By connecting the reference electrode 36 to the reference potential, electrical isolation between the driving side and the detecting side can be facilitated. Thus, the detection voltage V2 is determined only by the partial-potential ratio between Z and Rs, while the voltage is unlikely to be influenced by Rd. In addition, when the reference potential is obvious, a signal detection reference is defined so that accurate signal detection can be performed and the condition of the vibrator like the AGC circuit 46 can be accurately monitored. Moreover, in the vibrating gyroscope 20, since the reference electrode 36 is formed on the main surface of the vibrator 22, the reference electrode 36 can easily be connected to the reference potential.

Figure 6:
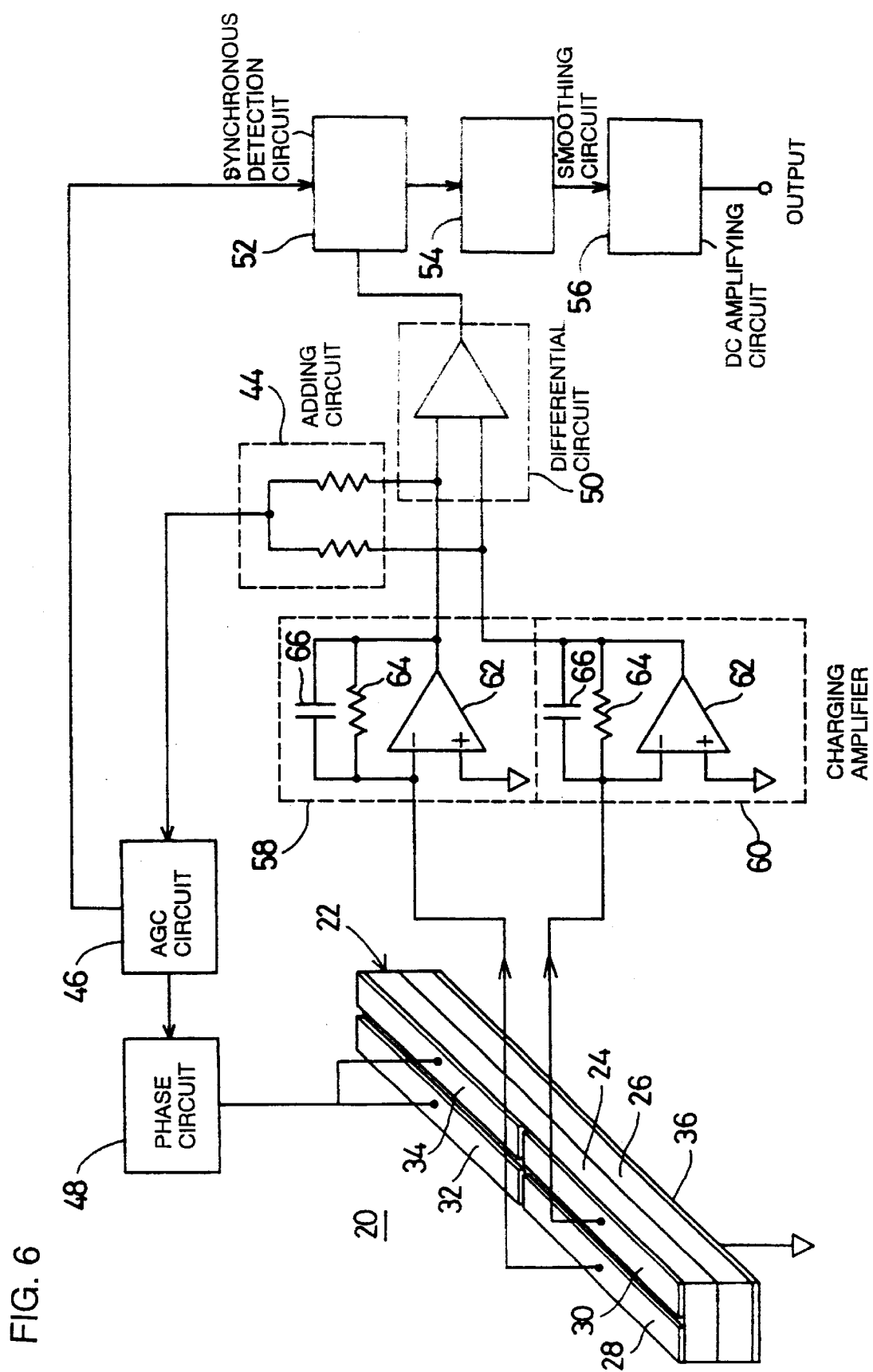
FIG. 6 is a block diagram showing another example of a circuit for using the vibrating gyroscope shown in FIG. 1.

In addition, as shown in FIG. 6, the detection electrodes 28 and 30 may be connected to charging amplifiers 58 and 60, and the charging amplifiers 58 and 60 may be connected to the adding circuit 44 and the differential circuit 50. Each of the charging amplifiers 58 and 60 includes an operational amplifier 62. Between the inverting input end and the output end of the operational amplifier 62, a resistor 64 and a capacitor 66 are connected. In addition, the non-inverting input end of the operational amplifier 62 is connected to the reference potential.

Figure 7:
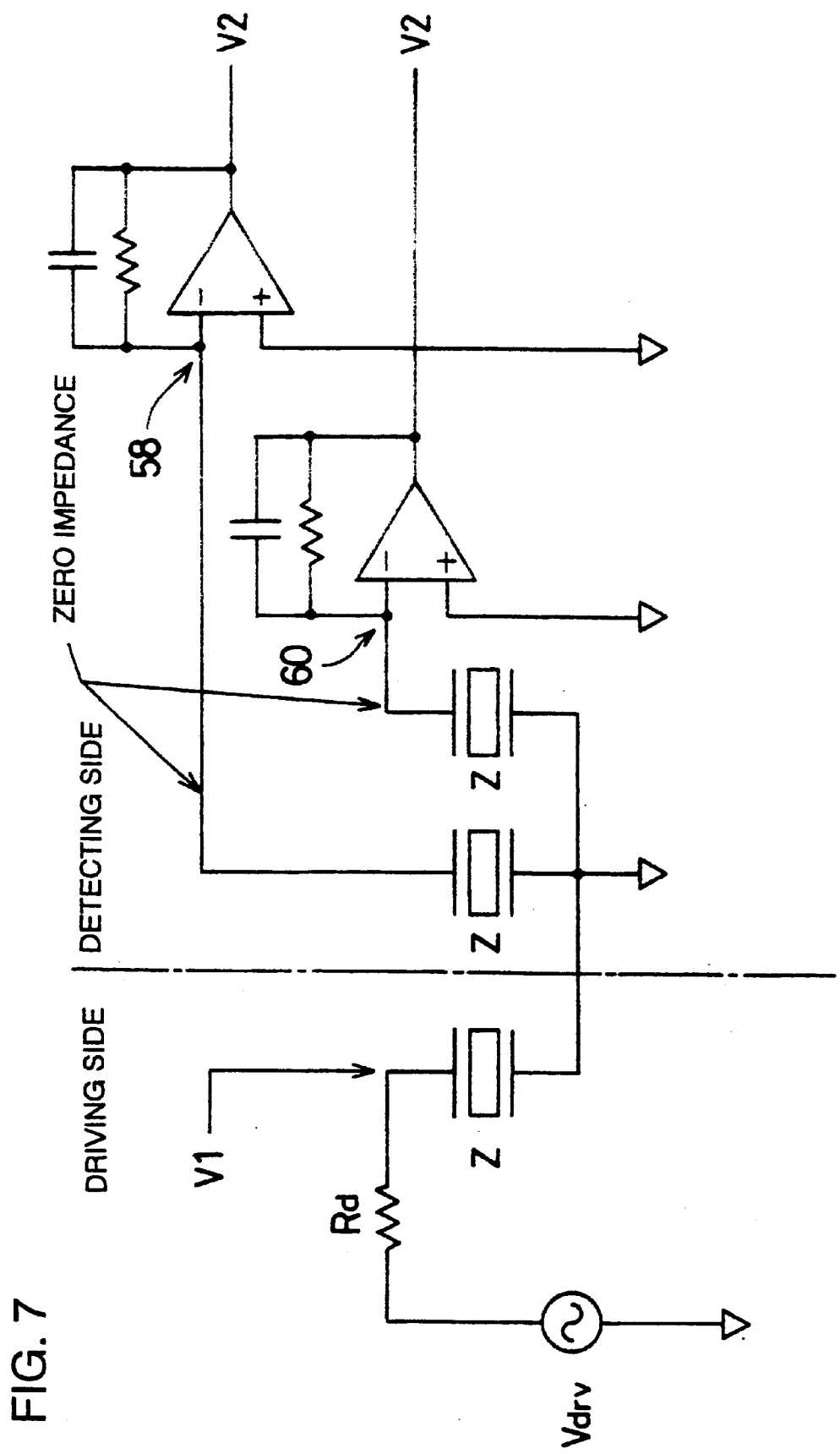
FIG. 7 is an equivalent circuit diagram of the vibrating gyroscope in the circuit shown in FIG. 6.

The charging amplifiers 58 and 60 convert generated charges into voltages, in which impedance is zero. Thus, as an equivalent circuit shown in FIG. 7, the detection voltage V2 is not influenced by the vibrator characteristic impedance Z, with the result that the vibration changes of the vibrator 22 due to a rotation angular velocity can be accurately detected.

In this way, when the reference electrode 36 is disposed in such a manner that the electrode 36 is opposed to the drive electrodes and detection electrodes, and then connected to the reference potential, electrical isolation between the driving side and the detecting side can be facilitated. Moreover, with the use of the charging amplifiers 58 and 60, the influence of the vibrator characteristic impedance can be eliminated. As a result, even if circuit impedance changes due to the changes in external environments and changes with the elapse of time, the rotation angular velocity can be accurately detected. Moreover, since the reference electrode 36 can be easily connected to the reference potential, this is advantageous in terms of processing accuracy and cost.

Figure 8A:
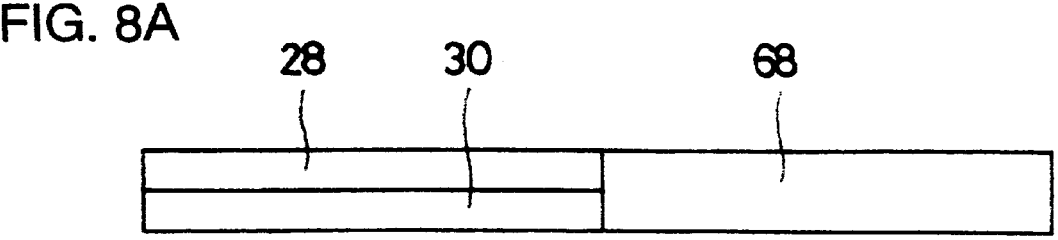
FIGS. 8A and 8B are plan views showing another example of the electrode arrangement of the vibrating gyroscope according to the present invention.
Figure 8B:
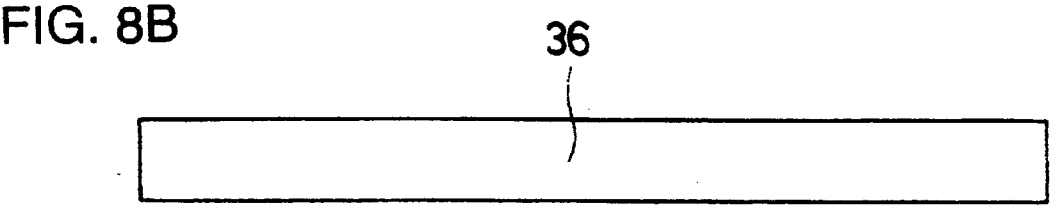
Figure 9A:
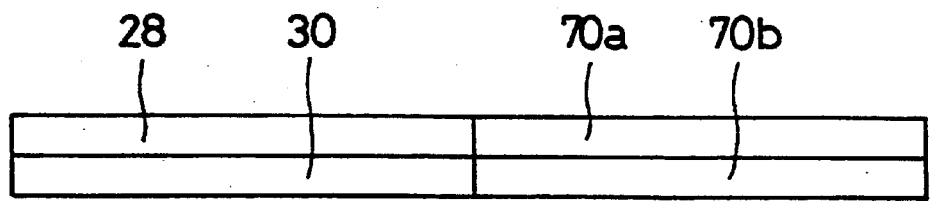
FIGS. 9A and 9B are plan views showing another example of the electrode arrangement of the vibrating gyroscope according to the present invention.
Figure 9B:
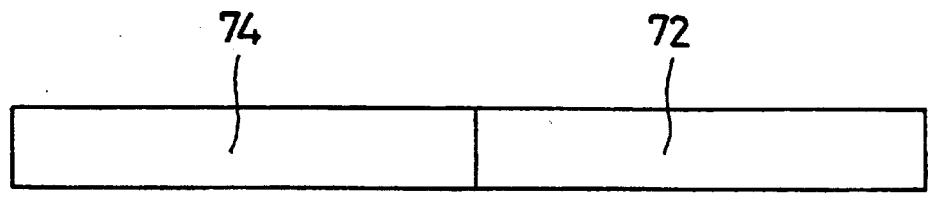
Figure 10:
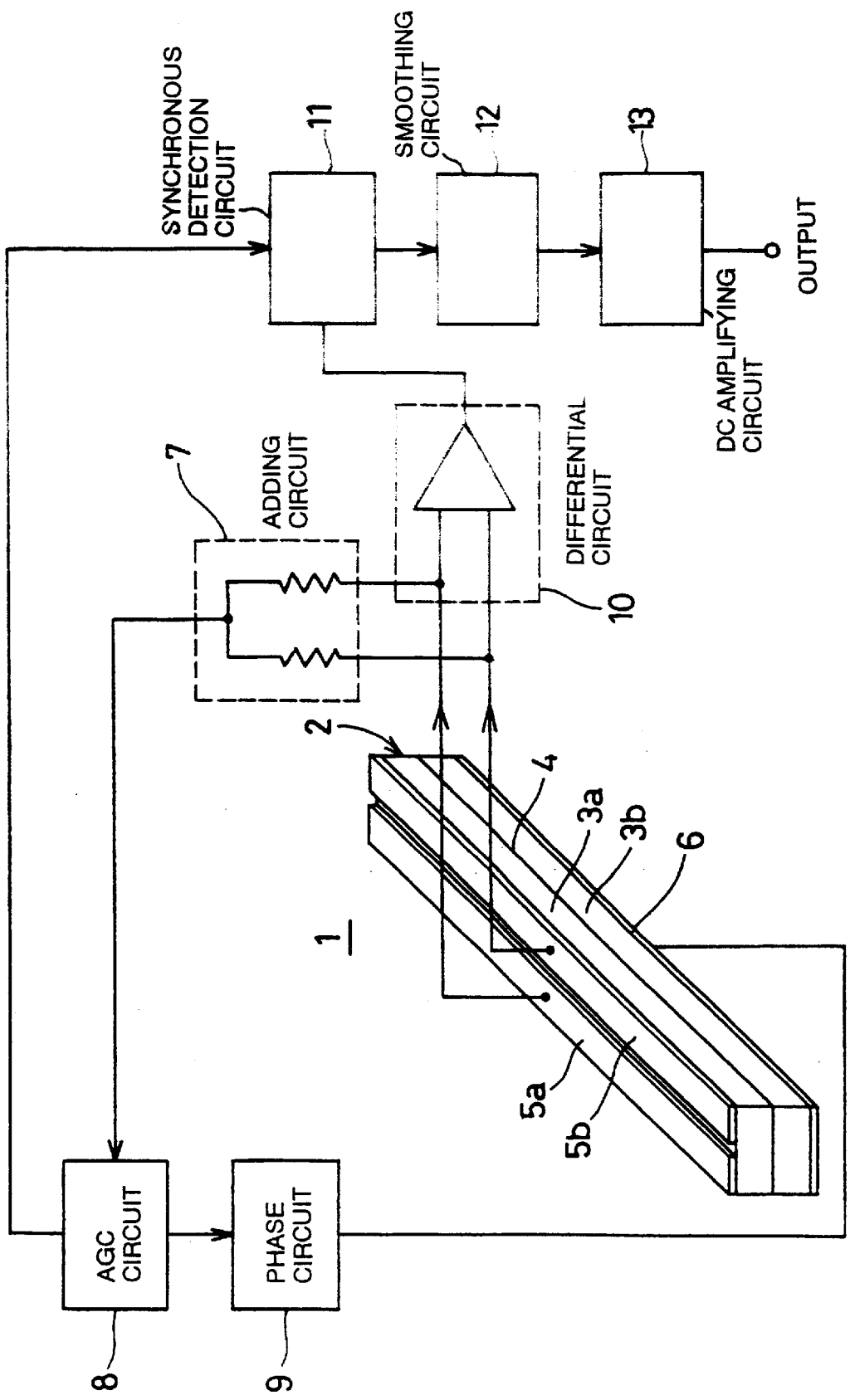
FIG. 10 is an illustration showing an example of a conventional vibrating gyroscope.
Figure 11:
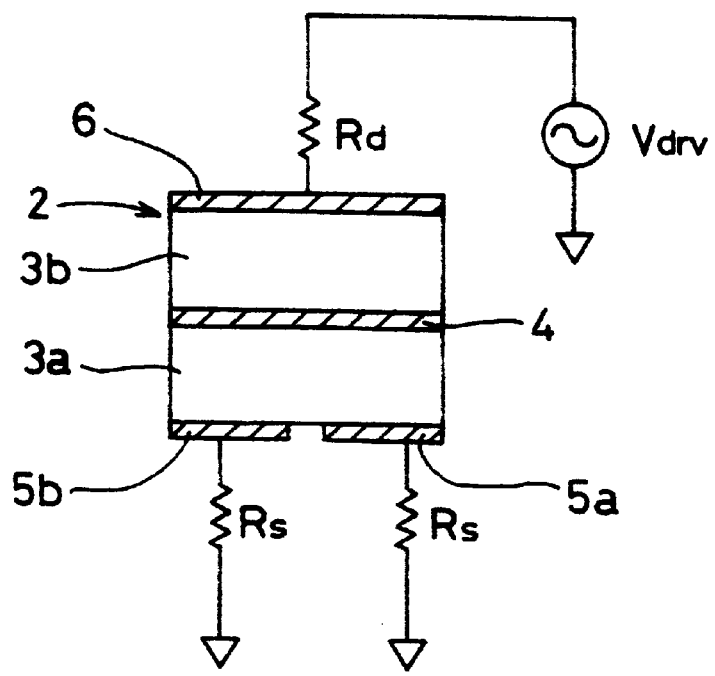
FIG. 11 is an equivalent circuit diagram of the conventional vibrating gyroscope shown in FIG. 10.
Figure 11:
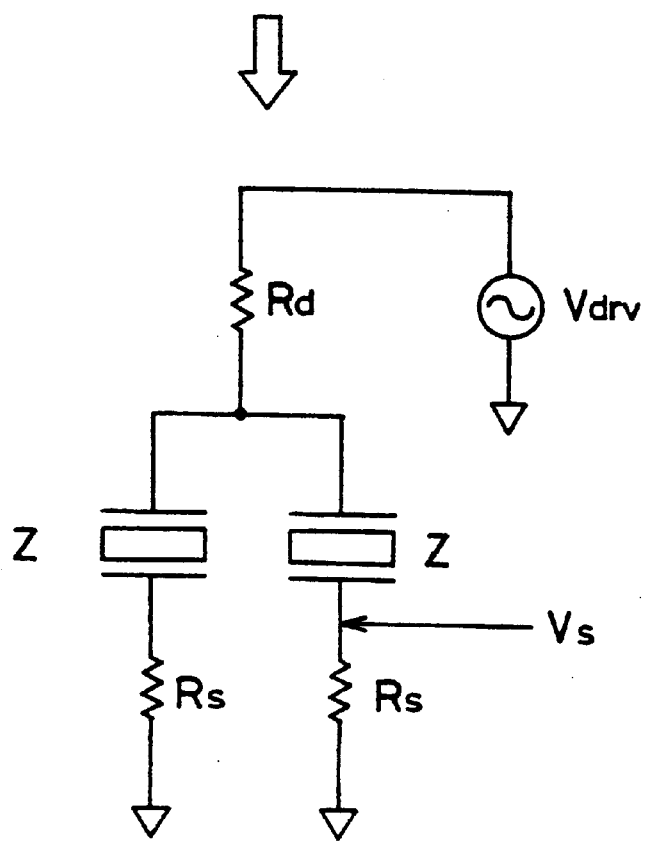

Regarding the arrangement of the electrodes on the vibrator 22, as shown in FIGS. 8A and 8B, on one of the main surfaces of the vibrator 22, two detection electrodes 28 and 30, and a drive electrode 68 may be formed and a reference electrode 36 may be formed on the entire part of the other main surface. In this case, the detection electrodes 28 and 30, and the drive electrode 68 may be formed by splitting an entire-surface electrode by etching or the like. In addition, as shown in FIGS. 9A and 9B, on one of the main surfaces of the vibrator 22, two detection electrodes 28 and 30, and two reference electrodes 70a and 70b may be formed, and on the other main surface thereof, a drive electrode 72 and a reference electrode 74 may be formed. In this situation, the detection electrodes 28 and 30 are opposed to the reference electrode 74, and the reference electrodes 70a and 70b are opposed to the drive electrode 72. In this case, these electrodes are formed by splitting the entire-surface electrode formed on both main surfaces of the vibrator 22 by dicer cutting or the like. In this way, the arrangement of the electrodes can be freely designed, and it is only necessary to form the reference electrodes in the positions opposing the detection electrodes or the drive electrodes.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:
   a vibrator including a plurality of piezoelectric members stacked and polarized in directions opposing each other and defining two mutually opposing main surfaces;
   at least one drive electrode formed on one of the main surfaces of the vibrator to input a signal for exciting the vibrator;
   at least two detection electrodes formed on one of the main surfaces of the vibrator to output a signal in accordance with vibration of the vibrator; and
   at least one reference electrode formed on at least one of the main surfaces of the vibrator in a position opposing at least one of the at least one drive electrode and the detection electrodes.

2. A vibrating gyroscope according to claim 1, wherein the one drive electrode and the detection electrodes are formed on the same main surface of the vibrator in different portions thereof.

3. A vibrating gyroscope according to claim 2, wherein the one driving electrode is connected to a driving circuit having a reference potential and the reference electrode is connected to the same reference potential.

4. A vibrating gyroscope according to claim 1, wherein one of the main surfaces includes the drive electrode and the one reference electrode, and the other main surface includes the detection electrodes opposite the one reference electrode and another reference electrode opposite the drive electrode.

5. A vibrating gyroscope according to claim 4, includes another drive electrode formed on the same main surface as the one drive electrode and in a position opposite the one drive electrode and wherein the one driving electrode and the another driving electrode are connected to a driving circuit having a reference potential and the reference electrode is connected to the same reference potential.

6. A vibrating gyroscope according to claim 2 including another drive electrode formed on the same main surface as the one drive electrode and in a position opposite to the one drive electrode.

7. A vibrating gyroscope according to claim 6, wherein the one driving electrode and the another drive electrode are connected to a driving circuit having a reference potential and the reference electrode is connected to the same reference potential.

8. A vibrating gyroscope according to one of claims 1 to 7, wherein the detection electrodes are connected to a charging amplifier for converting a generated charge into a voltage to detect a rotation angular velocity input from a differential signal of the output of the charging amplifier.

* * * * *